Oct. 5, 1948
2,450,761
Filed June ...                                                                 ...eets-Sheet 1
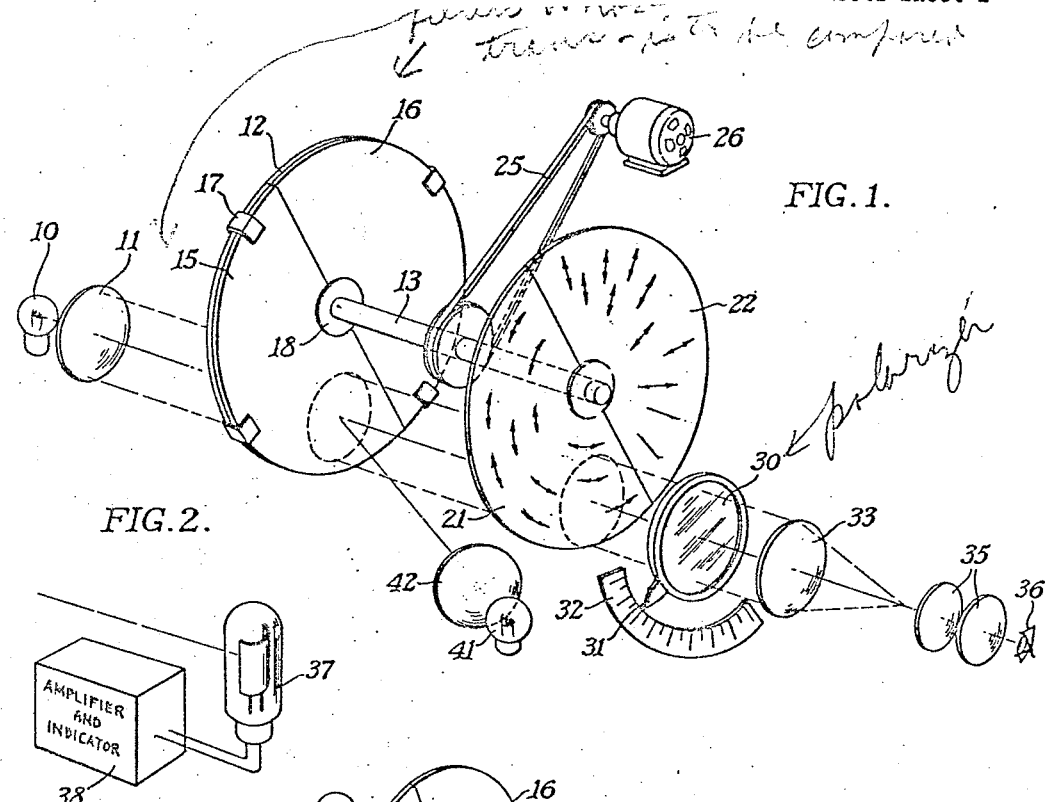
FIG. 1.
FIG. 2.
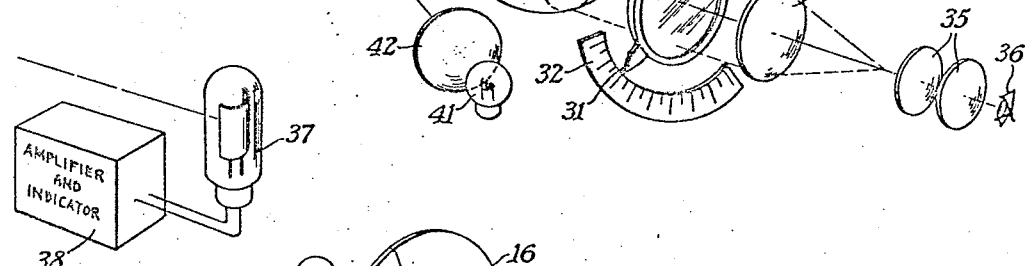
FIG. 3.
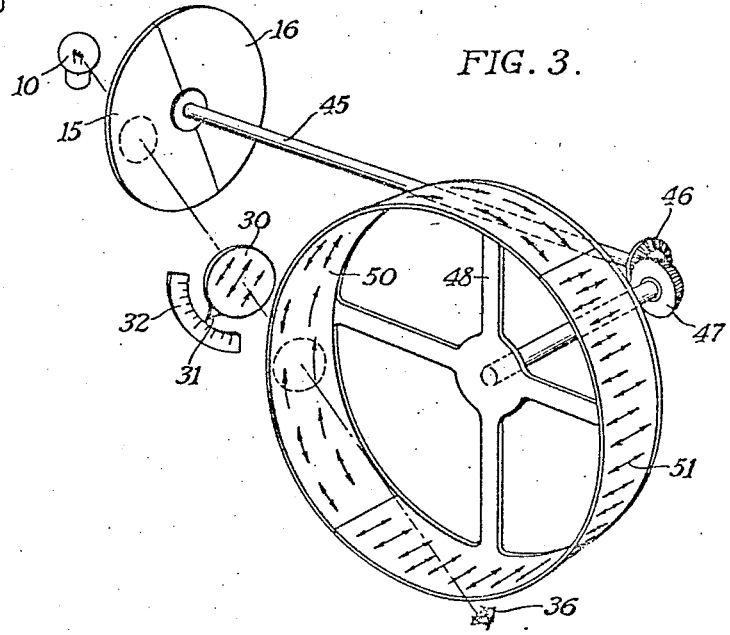
STEPHEN M. MacNEILLE
INVENTOR
BY
ATTY & AGT Oct. 5, 1948.　　　　　　　　S. M. MacNEILLE　　　　　　　2,450,761
FLICKER PHOTOMETERS PARTICULARLY FOR
MEASURING THE CONTRAST OF A LENS
Filed June 9, 1945　　　　　　　　　　　　　　　　2 Sheets-Sheet 2

STEPHEN M. MacNEILLE
INVENTOR

BY
ATTY & AG'T

Patented Oct. 5, 1948

2,450,761

UNITED STATES PATENT OFFICE 2,450,761

FLICKER PHOTOMETERS, PARTICULARLY FOR MEASURING THE CONTRAST OF A LENS

Stephen M. MacNeille, Oak Ridge, Tenn., assignor to Eastman Kodak Company, Rochester, N. Y., a corporation of New Jersey Application June 9, 1945, Serial No. 598,451

11 Claims. (Cl. 88—14)

This invention relates to flicker photometers and one preferred embodiment thereof relates to a flicker photometer in which the relative intensities of the comparison fields are a measure of the contrast of a lens or other optical system.

It is the primary object of the invention to provide a flicker photometer in which the comparison beams traverse exactly the same optical system so as to eliminate as far as possible all sources of error. Prior flicker photometers always involved some means for splitting the beams apart so that one traversed a slightly different optical system from the other. The instrument also has all of the advantages of other flicker photometers including the fact that the test may be made visually or by means of a photoelectric cell.

In flicker photometers a test field and a standard comparison field are presented alternately to the eye or photoelectric cell and the instrument is adjusted until the two fields have equal intensity as indicated by the absence of flicker. According to the present invention a flicker photometer is made up including some means for forming a beam of light of alternating intensity in accordance with the factor to be measured. Two polarizing filters with their vibration axes mutually at right angles when in the beam, are positionable in the beam alternatingly and synchronized with the varying intensity. Thus the two filters or sections of a filter correspond respectively to whatever two conditions cause the alternating intensity of the light beam. A plane polarizing filter is mounted somewhere in the light beam and is rotatable to vary the ratio of the alternating intensities. When flicker has been eliminated as detected through an eyepiece or by a photo-electric cell, the adjustment of the plane polarizing filter is a measure of how much the alternating intensities must be modified to be equal and hence is an indication of their ratio if the plane polarizing filter were absent.

For example two objects whose transmissions or reflectances are to be compared are mounted on a disc rotating through the light beam so that the objects intercept the light beam alternately. The movement of the two polarizing filters is synchronized with the movement of the objects also to intercept the light beam alternately.

In order to be able to use the photometer for measuring either transmission or reflection I prefer to have a light source which may be moved to either of two positions or to have two light sources which may be used alternatively, one for transilluminating filters and the like and the other for illuminating surfaces from the front. When using the instrument for comparing reflectances, one of the objects may be located permanently and the other mounted to be alternately positionable in front of the fixed object.

In order to test the optical contrast of a lens, telescope or the like I have arranged a flicker photometer so that the comparison fields receive light only from a small portion of an image formed by the lens. In the original object, this portion is a spot or other primary area surrounded by a background and the relative intensities of the spot and background are changed to provide the flicker. For example the background may be maintained as a constant white and the spot may be alternated between black and white. If the lens has perfect contrast none of the background light will be scattered into the image of the black spot and hence no light will reach the corresponding comparison field of the photometer. The amount of light scattered into the spot image is a measure of the lens contrast. A second embodiment of this could have a dark ground with a spot changing from black to white but this is less preferable since the contrast would then be measured only by the decrease in intensity of the white spot. A third arrangement or series or arrangements has the central spot of constant intensity, black, gray, or white and has the background change from black to white. Since the comparison fields are confined to the spot images, the differences in the fields will be entirely those caused by light scattered into the spot image when the background changes from black to white. I prefer in this embodiment to use a black or a gray, i. e. a medium bright spot compared to the intensities of the background.

It is an object of all of the embodiments of the invention relating to contrast meters to eliminate all the sources of scattered light or other variations which might introduce an error in the reading of the lens contrast.

According to the invention as applied to lens contrast meters there is provided an object consisting of a spot and a background of variable relative intensities, and means for holding the lens to be tested so that it receives light from the object and focuses it on a mask having an aperture therein for transmitting only some or all of the light in the image of the spot. The flicker detecting means is located behind the mask to receive the light transmitted through the aperture. In a preferred arrangement incorporating the above described type of flicker photometer, polarizing filters with their axes effectively at right angles are moved in synchronism with the shutter or whatever device is used for changing the relative intensities of the object spot and background, and intercept the beams and a single polarizing filter is rotatable to balance the intensities of the beams.

The details and refinements of the various embodiments of the invention and all of its advantages will be understood from the following description when read in connection with the accompanying drawings in which:

Fig. 1 is a schematic perspective view of the optical system of a photometer incorporating the invention.

Fig. 2 is a schematic showing of a flicker detecting device which may be used in place of the eye shown in Fig. 1.

Fig. 3 similarly shows an alternative arrangement of the invention.

Figure 4:
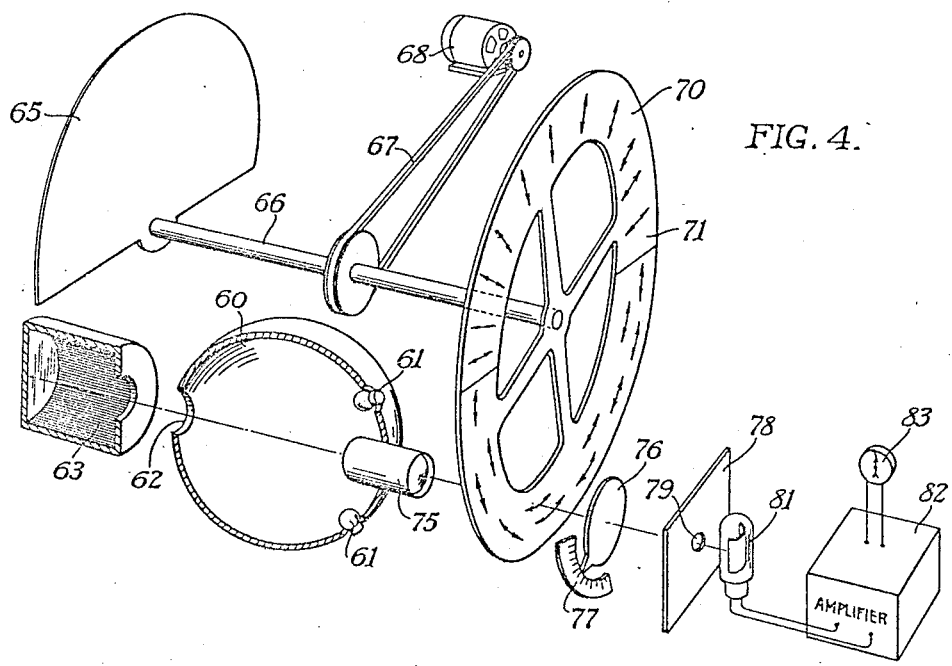

Fig. 4 is a schematic perspective view, partly cut away, of the optical system of a lens contrast meter according to the invention.

Figure 5:
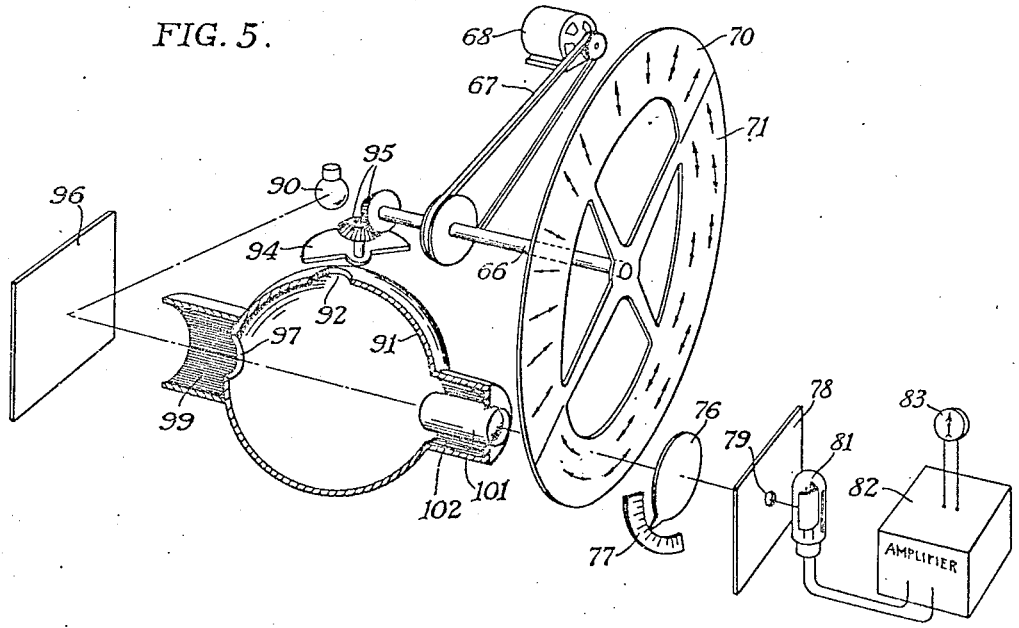

Fig. 5 similarly shows a slightly different lens contrast meter according to the invention.

In Fig. 1 light from a lamp 10 is collimated by a lens 11 to form a light beam which eventually is brought to focus by a lens 33 near the focal plane of an eyepiece 35 to be viewed by the eye 36 of an observer. A transparent disc 12 rotatable on a shaft 13 intercepts the beam of light. By means of clamps 17 and 18, two filters 15 and 16 whose transmissions are to be compared are mounted on the transparent disc 12. On the other end of the shaft 13 rotating synchronously with the test objects is a two-part polarizing filter. As indicated by the double headed arrows the two parts 21 and 22 have their vibration axes effectively at right angles, when positioned in the light beam. Actually one part has the vibration axis circumferentially oriented and the other part has it radially oriented. The shaft 13 is driven by a belt 25 and motor 26.

Somewhere in the light beam, preferably but not necessarily in the position shown, there is a plane polarizing filter 30 which is adjustable to control the ratio of the intensities of the two beams. If the filters 15 and 16 have identical transmission factors, the comparison beams will have identical intensities and there will be no flicker, when the filter 30 is oriented at 45° with respect to both the filters 21 and 22. Rotation of the filter 30 increases the relative amount of light of one beam and decreases that of the other. The adjustment of the filter 30 is indicated by a pointer 31 and scale 32 which may be calibrated to read intensities directly. The eye 36 of the observer may be replaced by a photoelectric cell 37 shown in Fig. 2 whose output is measured by an A. C. amplifier and indicator 38. Absence of flicker is indicated by the absence of any A. C. component in the photocell output.

If the objects 15 and 16 to be compared are opaque and their reflectances are to be measured, the light source 10 and the lens 11 may be replaced by a light source 41 and lens 42 positioned to illuminate the objects from the front. Preferably the instrument is made up with both light sources in position, only one being turned on at a time.

Fig. 3 differs from Fig. 1 in that the two section polarizing filter is made on a cylinder. The sections are shown as 50 and 51 mounted on a ring carried by a wheel 49 which is rotated in a plane at a slight angle to the light beam so that the filter intercepts the light beam at only one place. The filter is usually orthogonal to the light beam. The filter is connected by shaft 45 and bevel gears 46 and 47 to rotate synchronously with the test objects 15 and 16.

Fig. 4 illustrates one preferred form of contrast meter whose purpose is to measure the contrast of an image formed by a lens 75. If the lens were provided with perfect non-reflecting coatings on each air-glass surface and if no light were scattered by dust or by the mount, the contrast can be said to be unity since the image formed by the lens should have exactly the same contrast as the object. However, all factors which tend to redistribute the light or a portion thereof uniformly over the image plane reduces the contrast of the image by a factor which may be called the contrast of the lens.

The lens to be tested is mounted in one side of an integrating sphere 60 one-half of which is cut away in the drawing to illustrate the interior. Lamps 61 illuminate the interior of the integrating sphere 60 and also send light through an aperture 62 in the sphere diametrically opposite to the test lens 75. With the shutter 65 in the position shown, all light emerging from the sphere through the hole 62 is absorbed in a black box 63 so as not to re-enter the sphere. Thus the lens 75 views a field which includes a central black spot and a uniform white background extending to the edges of the field of the lens and beyond. This field is focussed by the lens 75 onto a mask 78 having an aperture 79 therein just slightly smaller than the image of the hole 62. Thus the aperture 79 transmits only light from the image of the central spot. If the lens 75 scattered no light whatever and had unit contrast, this image would be perfectly black and no light would be transmitted through the hole 79. If however, as is usually the case, there is some scattering of light by the lens 75, this light received from the background does reach and pass through the aperture 79 in the image plane.

In order to measure the amount of this scattered light a white shutter 65 is arranged to be alternately positionable over the hole 62 in the integrating sphere 60 thus to occlude the black box 63. When the shutter 65 is in the light beam, it presents to the lens 75 an object which includes a white spot on a white background. The shutter 65 is mounted on a shaft 66 to be rotated by a belt 67 and motor 68. For synchronous rotation therewith a two-part polarizing filter is carried by the shaft 66 with the two parts 70 and 71 arranged as before to have their vibration axes at right angles as determined in the beams. The relative intensities of the black and white spot images are determined by rotating a polarizing filter 76 along a scale 77 until the flicker in the beam through the aperture 79 is eliminated as indicated by a photocell 81, amplifier 82 and meter 83. This arrangement has proven eminently satisfactory in practice but theoretically would be difficult to use as perfection in lenses is approached since a perfect lens would give zero intensity for one of the fields which could not conveniently be matched by the testing instrument. However, the perfect lens is not likely to be made for many years to come and the many advantages of the arrangement shown in Fig. 4 render it preferable for all practical measurements. One advantage is the fact that light scattered from the front of the lens toward the object has no appreciable effect on the final measurement. Thus the measurement is conveniently confined directly to the characteristic in question.

In Fig. 5 there is shown an arrangement which eliminates the disadvantages of Fig. 4 and which utilizes the testing device efficiently in the measurement of optical contrast. A lamp 90 illuminates the interior of an integrating sphere 91 through an aperture 92. This light may be cut off entirely leaving the sphere darkened by means of a shutter 94 which is rotatable by bevel gears 95 synchronously with the polarizing filters 70 and 71, to permit measurements to be made as in Fig. 4. The lamp 90 also illuminates a gray area 96, the term "gray" being used to indicate that in general the intensity of the light in the central spot of the object may have any value relative to that of the background. The light reflected from the gray card 96 illuminates an aperture 97 in the sphere 91 which aperture is otherwise surrounded by a black tube 99 to absorb light emerging from the sphere through the aperture 97. A lens to be tested 101 is mounted in one side of the sphere to view this object and as before to focus it on a mask 78 having an aperture 79 therein just slightly smaller in diameter than the image of the hole 97. To minimize the amount of light passing from the sphere through the aperture 97 and being reflected to add to the light being tested, the lens 101 is surrounded by a black tube 102. The black tubes 99 and 102 are refinements which are not necessary in most practical testing. The lens 101 alternately views a gray spot on a white ground and a gray spot on a black ground. With a perfect lens the intensity in the spot image should be unaffected by the change in the intensity of the background. A practical lens having a contrast less than unity wastes some of the light from the gray spot when the background is black and throws extra light into the gray spot image when the background is white. The advantages of this embodiment are obvious and it is extremely useful. A black spot (consisting of a hole in a large black interior box) gives the largest change in intensity with changing background but the comparison field being black would require a measuring instrument different from the type here used; therefore a dark gray spot is preferred.

Having thus described several preferred embodiments of my invention, I wish to point out that it is not limited to these structures but is of the scope of the appended claims.

I claim:

1. A flicker photometer comprising means including a light source for forming a beam of light involving a factor to be measured, means for alternating the intensity of said beam, two polarizing filters alternately positionable in the beam with their vibration axes mutually at right angles when in the beam, means for alternately and synchronously with the alternation of the intensity produced by the beam forming means, positioning the two filters in the alternating beam, a plane polarizing filter mounted for rotary adjustment in the beam and coacting with said two polarizing filters to vary the ratio of the alternating intensities of the beam transmitted by said two filters, means for detecting flicker when the intensities are different and means for indicating the adjustment of the plane polarizing filter.

2. A flicker photometer according to claim 1 for comparing the light from two objects in which said beam alternating means includes means for alternately positioning the two objects in the light beam to be illuminated thereby.

3. A flicker photometer according to claim 1 in which the beam alternating means includes a rotatable member intercepting the light from the source to provide said alternating intensity, said rotating member and said positioning means being directly coupled for synchronous movement.

4. A flicker photometer for comparing the intensities of light from two objects, comprising a light source providing a beam of light, means for alternately positioning the objects in the light beam to be illuminated thereby and to provide alternating intensity to the light beam, light polarizing means with two sections alternately positionable in the light beam with the axes of the two sections effectively at right angles to each other, means for interchanging the objects in the light beam, means for interchanging the two sections in the alternating light beam synchronously with the objects whereby the two sections correspond respectively to the two objects, a plane polarizing filter also in the light beam mounted to be rotatable at least through a small angle, means for detecting flicker in the light beam caused by said interchanging and means for indicating the adjustment of the plane polarizing filter when flicker has been eliminated.

5. A flicker photometer according to claim 4 in which the objects and the polarizing means are both carried to be rotatable about a common axis of rotation laterally displaced from the light beam.

6. A flicker photometer according to claim 4 having two positions for the light source one to give a direct beam for transmission measurements and the other in front of the objects for front illuminating the same area of the objects for reflectance measurements.

7. A flicker photometer according to claim 4 in which one of the objects is effectively fixed to receive light from said source and to reflect it to the flicker detecting means and the other object is flat and is alternately positionable in front of the first object and to one side of the light beam.

8. A device for measuring the contrast of image forming optical systems comprising means for providing an object having a primary area and a background whose relative light intensities are variable, means for cyclically varying said relative intensities, means for holding the optical system to be tested to receive varying light from the object and to form an image thereof, a mask at the image plane having an aperture smaller than the image of the primary area for transmitting only the light reaching a portion of the image of said primary area whereby the light transmitted by the aperture includes light from said primary area and scattered light from said background and is varied cyclically by said varying means, cyclically variable light modifying means in the light beam from the optical system synchronized with said varying means and including an adjustable member for adjusting the cyclical variations of the intensity in said beam and for eliminating these variations, means for detecting flicker caused by said differences in intensity and means for indicating the adjustment of said intensity adjusting means.

9. A contrast meter according to claim 8 in which said primary area is a paraxially located spot in the object field.

10. A contrast meter according to claim 8 in which the intensity adjusting means includes a polarizing filter having two sections alternately positionable in the light beam with their vibration axes mutually at right angles and a plane polarizing filter also mounted in the light beam to be rotatable at least through a small angle for controlling the relative intensity of the light beams through the two sections of the polarizing means.

11. A device for measuring the contrast of image forming optical systems comprising means for providing an object having a primary area and a background whose relative light intensities are variable, means for cyclically varying said relative intensities, means for holding the optical system to be tested to receive varying light from the object and to form an image thereof, a mask at the image plane having an aperture smaller than the image of the primary area for transmitting only the light reaching a portion of the image of said primary area whereby the light transmitted by the aperture includes light from said primary area and scattered light from said background and is varied cyclically by said varying means, photoelectric means for detecting the variations in said relative intensities, cyclically variable and adjustable light modifying means synchronized with said varying means for adjusting the variations in intensity in the light falling on said photoelectric means and means for indicating the adjustment of said light modifying means.

STEPHEN M. MacNEILLE.

REFERENCES CITED

The following references are of record in the file of this patent:

UNITED STATES PATENTS

| Number | Name | Date |
| --- | --- | --- |
| 1,987,441 | Hardy | Jan. 8, 1935 |